(12) United States Patent
Katzenberger et al.

(10) Patent No.: US 10,977,006 B2
(45) Date of Patent: Apr. 13, 2021

(54) OPTIMIZED MACHINE LEARNING PIPELINE EXECUTION BASED ON EXECUTION GRAPHS

(71) Applicant: Microsoft Technology Licensing, LLC, Redmond, WA (US)

(72) Inventors: Gary Shon Katzenberger, Fall City, WA (US); Thomas William Finley, Bellevue, WA (US); Petro Luferenko, Redmond, WA (US); Mohammad Zeeshan Siddiqui, Bellevue, WA (US); Costin I. Eseanu, Redmond, WA (US); Eric Anthony Erhardt, Bismark, ND (US); Yael Dekel, Redmond, WA (US); Ivan Matantsev, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 4 days.

(21) Appl. No.: 16/598,663

(22) Filed: Oct. 10, 2019

(65) Prior Publication Data
US 2020/0348912 A1 Nov. 5, 2020

Related U.S. Application Data

(60) Provisional application No. 62/843,245, filed on May 3, 2019.

(51) Int. Cl.
*G06F 8/30* (2018.01)
*G06N 20/00* (2019.01)
(Continued)

(52) U.S. Cl.
CPC .......... *G06F 8/31* (2013.01); *G06F 9/30036* (2013.01); *G06F 9/30079* (2013.01);
(Continued)

(58) Field of Classification Search
None
See application file for complete search history.

(56) References Cited

U.S. PATENT DOCUMENTS

| | | | |
|---|---|---|---|
| 2019/0129764 A1* | 5/2019 | Johnson | G06N 20/00 |
| 2019/0278640 A1* | 9/2019 | Khare | G06F 9/5027 |

(Continued)

OTHER PUBLICATIONS

Olston, "TensorFlow-Serving: Flexible, High-Performance ML Serving", 2017, 31st Conference on Neural Information Processing Systems (NIPS 2017) (Year: 2017).*

(Continued)

*Primary Examiner* — Hossain M Morshed
(74) *Attorney, Agent, or Firm* — Fiala & Weaver P.L.L.C.

(57) ABSTRACT

Embodiments provide a machine learning framework that enables developers to author and deploy machine learning pipelines into their applications regardless of the programming language in which the applications are structured. The framework may provide a programming language-specific API that enables the application to call a plurality of operators provided by the framework. The framework provides any number of APIs, each for a different programming language. The pipeline generated via the application is represented as an execution graph comprising node(s), where each node represents a particular operator. When a pipeline is submitted for execution, calls to the operators are detected, and nodes corresponding to the operators are generated for the execution graph. Once the execution graph is complete, the execution graph is provided to an execution engine, which reconstructs a corresponding execution graph that is structured in accordance with the operators' programming language and executes the reconstructed execution graph.

20 Claims, 6 Drawing Sheets

(51) Int. Cl.

| | |
|---|---|
| *G06F 16/2455* | (2019.01) |
| *G06F 16/2453* | (2019.01) |
| *G06F 9/30* | (2018.01) |
| *G06F 9/50* | (2006.01) |
| *G06F 9/54* | (2006.01) |
| *G06F 12/02* | (2006.01) |

(52) U.S. Cl.
CPC .......... *G06F 9/5016* (2013.01); *G06F 9/5022* (2013.01); *G06F 9/544* (2013.01); *G06F 12/0207* (2013.01); *G06F 16/24535* (2019.01); *G06F 16/24568* (2019.01); *G06N 20/00* (2019.01)

(56) References Cited

U.S. PATENT DOCUMENTS

| | | | | |
|---|---|---|---|---|
| 2020/0081916 | A1* | 3/2020 | McShane | G06F 3/0486 |
| 2020/0250897 | A1* | 8/2020 | Wei | G07C 3/14 |
| 2020/0272934 | A1* | 8/2020 | Manamohan | G06N 20/00 |
| 2020/0293491 | A1* | 9/2020 | Zhang | G06F 16/156 |
| 2020/0348912 | A1* | 11/2020 | Katzenberger | G06N 20/00 |
| 2020/0348990 | A1 | 11/2020 | Katzenberger et al. | |
| 2020/0349469 | A1 | 11/2020 | Katzenberger et al. | |

OTHER PUBLICATIONS

"Bureau of Transportation Statistics Flight Delay Dataset 2018", Retrieved from: https://www.transtats.bts.gov/Fields.asp?Table_ID=236, Jun. 20, 2019, 3 Pages.

"Caffe 2. 2018", Retrieved from: https://caffe2.ai/, Jun. 20, 2019, 2 Pages.

"Criteo 2014 Kaggle Challenge", Retrieved from: http://labs.criteo.com/2014/02/kaggle-display-advertising-challenge-dataset/, Feb. 10, 2014, 5 Pages.

"H2O", Retrieved from: https://github.com/h2oai/h2o-3, Jun. 20, 2019, 20 Pages.

"Jupyter", Retrieved from: https://jupyter.org/, Jun. 20, 2019, 7 Pages.

"LightGBM: A Highly Efficient Gradient Boosting Decision Tree", In Proceedings of 31st Conference on Neural Information Processing, Dec. 4, 2017, 2 Pages.

"Matplotlib", Retrieved from: https://matplotlib.org/, Jun. 20, 2019, 3 Pages.

"ML.NET", Retrieved from: https://github.com/dotnet/machinelearning, Jun. 20, 2019, 4 Pages.

"Nimbus ML", Retrieved from: https://github.com/Microsoft/NimbusML, Jun. 20, 2019, 3 Pages.

"PyTorch", Retrieved from: http://pytorch.org/, Mar. 15, 2017, 4 Pages.

"The State of Data Science and Machine Learning", Retrieved from: https://www.kaggle.com/surveys/2017/, Jun. 20, 2019, 11 Pages.

"TransmogrifAI", Retrieved from: https://transmogrif.ai/, Jun. 20, 2019, 4 Pages.

"Zeppelin", Retrieved from: https://zeppelin.apache.org/, Jun. 20, 2019, 9 Pages.

Abadi, et al., "TensorFlow: A System for Large-scale Machine Learning", In Proceedings of the 12th USENIX Conference on Operating Systems Design and Implementation, vol. 16, Nov. 2, 2016, pp. 265-283.

Abrahams, et al., "Boost.Python", Retrieved from: https://www.boost.org/doc/libs/1_70_0/libs/python/doc/html/index.html, Jun. 20, 2019, 1 Page.

Agarwal, et al., "CNTK: Microsoft's Open-Source Deep-Learning Toolkit", In Proceedings of the 22nd International Conference on Knowledge Discovery and Data Mining, Aug. 13, 2016, pp. 2135.

Amizadeh, et al., "Making Classical Machine Learning Pipelines Differentiable: A Neural Translation Approach", Retrieved from https://arxiv.org/pdf/1906.03822.pdf, Jun. 10, 2019, 9 Pages.

Andrew, et al., "Scalable Training of L1-Regularized Log-Linear Models", Retrieved from: https://www.microsoft.com/en-us/research/wp-content/uploads/2007/01/andrew07scalable.pdf, Jan. 1, 2007, 8 Pages.

Chen, et al., "MXNet: A Flexible and Efficient Machine Learning Library for Heterogeneous Distributed Systems", In Journal of the Computing Research Repository, Dec. 2015, 6 Pages.

Colbert, et al., "The NumPy Array: A Structure for Efficient Numerical Computation", In Journal of Computing in Science & Engineering vol. 13, Issue 2, Mar. 14, 2011, 8 Pages.

Crankshaw, "Clipper: A Low-Latency Online Prediction Serving System", In Proceedings of 14th USENIX Symposium on Networked Systems Design and Implementation, Mar. 27, 2017, pp. 613-627.

Eerhardt, et al., "I Data View Implementation", Retrieved from: https://github.com/dotnet/machinelearning/blob/master/docs/code/IDataViewImplementation.md, Jun. 20, 2019, 16 Pages.

Finley, Tom, "Dotnet Machinelearning", Retrieved from: https://github.com/dotnet/machinelearning/blob/master/docs/code/IDataViewDesignPrinciples.md, Jun. 20, 2019, 14 Pages.

Friedman, "Greedy Function Approximation: A Gradient Boosting Machine", In Journal of Annals of statistics, vol. 29, Issue 5, Oct. 2001, pp. 1189-1232.

Graefe, Goetz., "Volcano: An Extensible and Parallel Query Evaluation System", In IEEE Transactions on Knowledge and Data Engineering vol. 6, Issue 1, Feb. 1994, pp. 120-135.

McAuley, et al., "Ups and Downs: Modeling the Visual Evolution of Fashion Trends with One-Class Collaborative Filtering", In Proceedings of the 25th International World Wide Web Conferences Steering Committee, 2016, Apr. 11, 2016, pp. 507-517.

McKinney, Wes., "Pandas: a Foundational Python Library for Data Analysis and Statistics", In Journal for Python for High Performance and Scientific Computing vol. 14, 2011, 9 Pages.

Meng, et al., "MLlib: Machine Learning in Apache Spark", In Journal of Machine Learning Research vol. 17, Issue 1, Jun. 2016, 7 Pages.

Michelangelo, "Michelangelo", https://eng.uber.com/michelangelo/, Sep. 5, 2017, 22 Pages.

Mikolov, et al., "Distributed Representations of Words and Phrases and their Compositionality", In Proceedings of the 27th Annual Conference on Neural Information Processing Systems, Dec. 5, 2013, pp. 3111-3119.

Olston, et al., "TensorFlow-Serving: Flexible, High-Performance ML Serving", Retrieved from: https://arxiv.org/pdf/1712.06139.pdf, Dec. 27, 2017, 8 Pages.

Pedregosa, et al., "Scikit-learn Machine Learning in Python", In Journal of Machine Learning Research vol. 12, Oct. 2011, pp. 2825-2830.

Shmoradims, et al., "I Data ViewType System", Retrieved from: https://github.com/dotnet/machinelearning/blob/master/docs/code/IDataViewTypeSystem.md, Jun. 20, 2019, 20 Pages.

Shwartz, et al., "Pegasos: Primal Estimated Sub-Gradient Solver for SVM", In Journal of Mathematical Programming vol. 127, Issue 1, Jun. 20, 2019, 27 Pages.

Stonebraker, et al., "C-store: A Column-oriented DBMS", In Proceedings of the 31st International Conference on Very Large Data Bases, Aug. 30, 2005, pp. 553-564.

Tran, et al., "Scaling up Stochastic Dual Coordinate Ascent", In Proceedings of the 21th ACM SIGKDD International conference on Knowledge Discovery and Data Mining, Aug. 10, 2015, pp. 1185-1194.

Varoquaux, Gael., "Joblib Documentation", Retrieved from: https://buildmedia.readthedocs.org/media/pdf/joblib/latest/joblib.pdf, Jun. 19, 2019, 83 Pages.

Zaharia, et al., "Resilient Distributed Datasets: A Fault-Tolerant Abstraction for In-Memory Cluster Computing", In Proceedings of the 9th USENIX conference on Networked Systems Design and Implementation, Apr. 25, 2012, 14 Pages.

Zinkevich, Martin., "Rules of Machine Learning: Best Practices for ML Engineering", Retrieved from: http://martin.zinkevich.org/rules_of_ml/rules_of_ml.pdf, Jun. 20, 2019, 24 Pages.

(56) References Cited

OTHER PUBLICATIONS

Zeeshan, et al., "Machine Learning at Microsoft with ML.NET", In Journal of Computer Science, May 14, 2019, 11 Pages.

\* cited by examiner

502 — For each node in the second execution graph, issuing a function call corresponding to the operator associated with the node, the function call being structured in accordance with the second programming language

600

OPTIMIZED MACHINE LEARNING PIPELINE EXECUTION BASED ON EXECUTION GRAPHS

CROSS-REFERENCE TO RELATED APPLICATIONS

This application claims priority to U.S. Provisional Patent Application No. 62/843,245, filed May 3, 2019, the entirety of which is incorporated by reference herein.

BACKGROUND

Machine learning is transitioning from an art and science into a technology available to every developer. In the near feature, every application on every platform will incorporate trained models to encode data-based decisions that would be impossible for developers to author. This presents a significant engineering challenge, since, currently, data science and modeling are largely decoupled from standard software development processes. This separation makes incorporating machine learning capabilities inside applications unnecessarily costly and difficult, and furthermore, discourages developers from embracing machine learning.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein provide a machine learning framework that enables developers to author and deploy machine learning pipelines into their applications regardless of the programming language in which the applications are structured. For example, the machine learning framework may be structured in accordance with a low-level programming language to optimize performance thereof (C #, C++, etc.), whereas the application in which the machine learning pipeline is incorporated may be implemented in a high-level language (e.g., Python, Scala, R, etc.) The framework may provide a programming language-specific API (or a set of bindings) that enables the application to call or reference a plurality of operators (e.g., data featurizers, data transformations, machine learning algorithms), to be included in the machine learning pipeline, provided by the framework. The framework may provide any number of APIs, each being structured in accordance with a different programming language, thereby enabling any type of application to interface with the framework.

The pipeline generated via the application may be represented as an execution graph comprising a plurality of nodes, where each node represents a particular operator. The execution graph is structured in accordance with the programming language of the application. The execution graph also represents an order in which the operators are to be executed and/or dependencies between the nodes. When a pipeline is submitted for execution, calls to the operators (via the programming language-specific API) are detected, and nodes corresponding to the operators are generated for the execution graph. Once the execution graph is complete, the execution graph is provided to an execution engine for execution of the pipeline. The execution engine reconstructs (or generates) a corresponding execution graph that is structured in accordance with the programming language in which the operators are implemented and executes the reconstructed execution graph.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
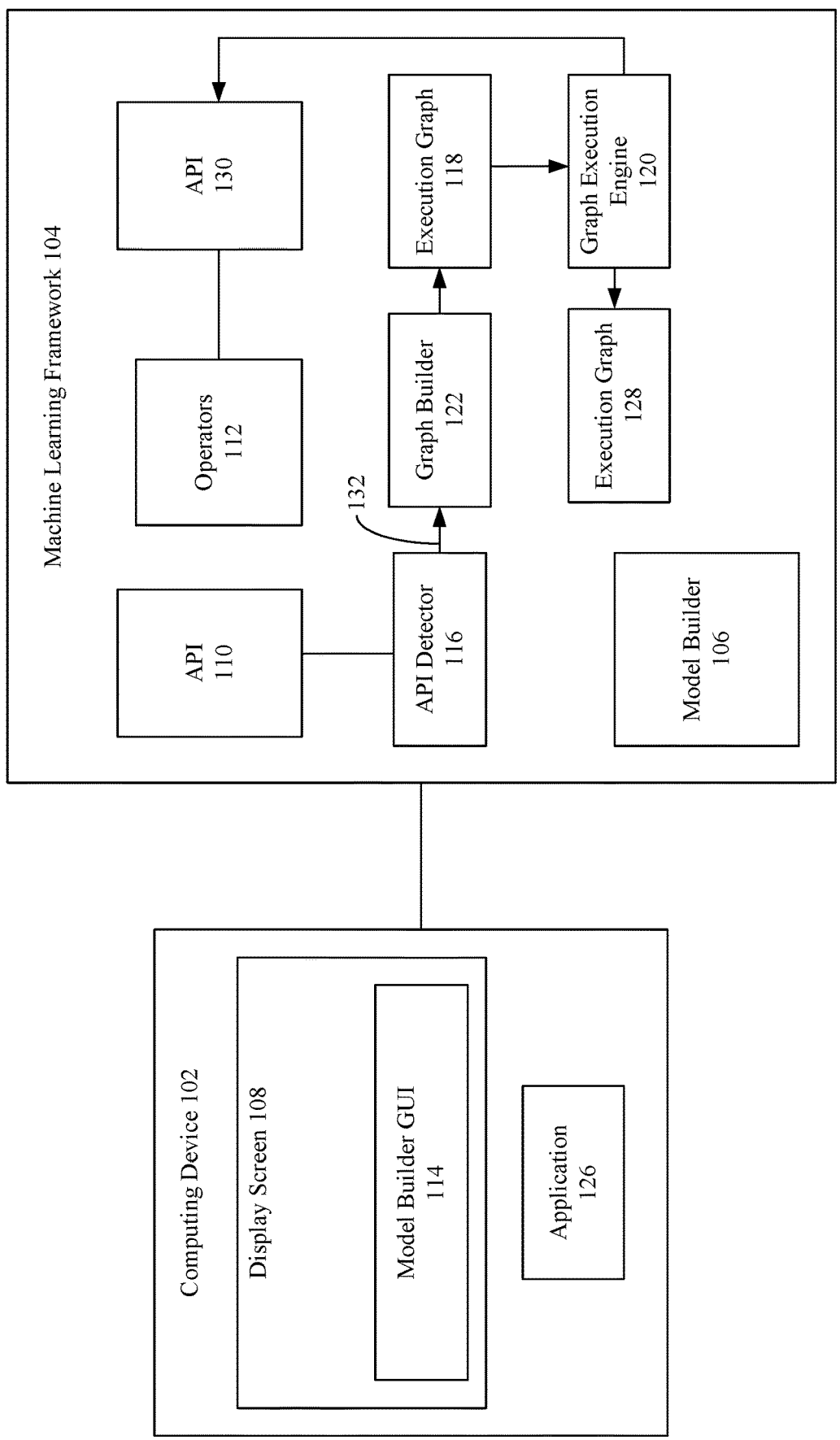
FIG. 1 shows a system for building a machine learning pipeline for integration within an application, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to a machine learning framework that enables developers to author and deploy machine learning pipelines into their applications regardless of the programming language in which the applications are structured. For example, the machine learning framework may be structured in accordance with a low-level programming language to optimize performance thereof (C#, C++, etc.), whereas the application in which the machine learning pipeline is incorporated may be implemented in a high-level language (e.g., Python, Scala, R, etc.) The framework may provide a programming language-specific API (or a set of bindings) that enables the application to call or reference a plurality of operators (e.g., data featurizers, data transformations, machine learning algorithms), to be included in the machine learning pipeline, provided by the framework. The framework may provide any number of APIs, each being structured in accordance with a different programming language, thereby enabling any type of application to interface with the framework.

The pipeline generated via the application may be represented as an execution graph comprising a plurality of nodes, where each node represents a particular operator. The execution graph is structured in accordance with the programming language of the application. The execution graph also represents an order in which the operators are to be executed and/or dependencies between the nodes. When a pipeline is submitted for execution, calls to the operators (via the programming language-specific API) are detected, and nodes corresponding to the operators are generated for the execution graph. Once the execution graph is complete, the execution graph is provided to an execution engine for execution of the pipeline. The execution engine reconstructs (or generates) a corresponding execution graph that is structured in accordance with the programming language in which the operators are implemented and executes the reconstructed execution graph.

Generally, interoperability services (e.g., Component Object Model (COM) interop) are invoked that enable applications structured in accordance with one programming language to access functions structured in accordance with another programming language. Such services are typically compute-resource intensive (e.g., such services require processing power and/or memory). The burden placed on such resources increases for each function called by the application. The techniques disclosed herein advantageously minimizes this burden by dramatically reducing the number of interops. In particular, the execution graph provided to the execution engine effectively provides a listing of each of the operator calls required for the machine learning pipeline. The execution graph is provided to the execution engine via a single interop. The execution graph analyzes the graph and generates another execution graph specifying function calls to the operators that are structured in accordance with the same programming language in which the operators are implemented. Accordingly, rather than requiring an interop for each function call to an operator, a single interop is required to provide an execution graph that specifies the function calls.

For instance, FIG. 1 shows a system 100 for building a machine learning pipeline for integration within an application, according to an example embodiment. As shown in FIG. 1, system 100 includes a computing device 102 and a machine learning framework 104. Machine learning framework 104 may enable users (e.g. developers) to develop or create complex machine learning models, evaluate them, and utilize them directly for prediction. Machine learning framework 104 may also enable users to easily integrate models into their software applications. In accordance with an embodiment, machine learning framework 104 is a .NET machine learning library (also referred to as ML.NET by Microsoft Corporation®).

Users may access machine learning framework 104 via computing device 102. For example, machine learning framework 104 may be implemented via one or more servers and/or other computing devices. In such an example, computing device 102 and the server(s) may each include at least one network interface that enables communications with machine learning framework 104 over one or more networks. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network(s) include a local area network (LAN), a wide area network (WAN), a personal area network (PAN), and/or a combination of communication networks, such as the Internet. In another example, machine learning framework 104 may be included in computing device 102. For example, machine learning framework 104 may be loaded as a library utilized by an application being developed by a developer (e.g., application 126).

As shown in FIG. 1, machine learning framework 104 comprises a model builder 106, a first application programming interface (API) 110, one or more operators 112, an API detector 116, a graph builder 122, a graph execution engine 120, and a second API 130. Model builder 106 may be configured to be operated/interacted with to create machine learning models. For instance, a developer may instantiate model builder 106, which causes a model builder GUI 114 to be displayed via a display screen 108 of computing device 102.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Model builder GUI 114 may be interacted with by the developer to collect and load training data, specify a pipeline of operators (e.g., operators 112) (which may be used to extract features from data, transform data, and/or apply a machine learning algorithm to the data), and train the machine learning model, which may be incorporated in an application (e.g., application 126) being developed by a developer. Each of operators 112 may comprise one or more of a data featurizer, a data transformer, and/or machine learning algorithm. An example of a data featurizer includes, but is not limited to, featurization techniques that convert text to a numerical vector representation. Examples of data transformers include, but are not limited to, techniques that normalize and/or scale data, convert data from one data type to another data type, transform text and/or images, etc. Examples of machine learning algorithms include, but are not limited to, a gradient-boosting tree-based machine learning algorithm (e.g., FastTree, LightGBM, etc.), a linear-based machine learning algorithm (e.g., OWL-QN, SDCA, Pegasos, etc.), and/or other types of machine learning algorithms Operators 112 may be implemented as dynamic linked libraries (DLLs).

A developer may include an operator of operators 112 in a pipeline via a function call to a function corresponding to operator. In certain cases, certain portions of machine learning framework 104 (e.g., operators 112 and graph execution engine 120) may be structured in accordance with a particular programming language (e.g., C #, C++, etc.), but the programming language used to build a machine learning model (e.g., application 126) is different. For instance, operators 112 and graph execution engine 120 may be structured in accordance with a first programming language (e.g., C #, C++, etc.), whereas the language used to build the machine learning model may be structured in accordance with a second programming language (e.g., Python, Scala, R). In order to enable to build a machine learning model in such a case, machine learning framework 104 makes avail API 110 to the developer.

API 110 enables operators 112 to be called and/or referenced via applications and/or processes (e.g., application 126) that are structured in accordance with another programming language. For instance, API 110 may be a binding (or glue code) that enables operators 112 to be referenced and/or called via another programming language. For instance, a developer may include an operator of operators 112 in a pipeline via an API call to API 110, specifying the function corresponding to operator. As will be described below with reference to FIGS. 7 and 8, API 110 may be automatically generated by a bindings generator.

When a pipeline is submitted for execution (e.g., during execution of application 126), the API calls to operators 112 via API 110 may be monitored by API detector 116. For each API call for an operator of operators 112 that is detected, API detector 116 provides an indication 132 to graph builder 122. Indication 132 may specify at least one of a name of the corresponding operator, one or more inputs for the corresponding operator, one or more outputs for corresponding operator, another node from which the one or more inputs are provided and/or another node to which the one or more outputs are provided. For each indication 132 received, graph builder 122 generates a node corresponding to the operator of operators 112 for an execution graph 118.

Execution graph 118 is representative of the machine learning pipeline developed by the developer. Each node in execution graph 118 may specify the information included in indicator 120. For example, each node may specify at least one of a name of the corresponding operator, one or more inputs for the corresponding operator, one or more outputs for corresponding operator, another node from which the one or more inputs are provided and/or another node to which the one or more outputs are provided. The nodes and execution graph 118 may formatted in accordance with a JavaScript Object Notation (JSON) file and may be structured in accordance with the programming language in which application 126 is structured (e.g., Python).

Graph builder 122 continues to update execution graph 118 with nodes until API detector 116 detects an API call for a function that is configured to train the machine learning model. In an embodiment in which machine learning framework 104 is ML.NET, such a function may be the pipe.Fit() function, although the embodiments described herein are not so limited. Upon detecting an API call to such a function, execution graph 118 is provided to graph execution engine 120. API 110 may also provide one or more pointers to memory in which the training data is located to graph execution engine 120. Execution graph 118 may be provided to graph execution engine 120 via a single interop (e.g., the generation of code (e.g., a wrapper) that enables one programming language to access code that is in accordance to another programming language).

As described above, graph execution engine 120 may be structured in accordance with a second programming language (e.g., C #). Graph execution engine 120 reconstructs (or generates) a second execution graph (e.g., execution graph 128) based on execution graph 118. Execution graph 128 is structured in accordance with the programming language in which graph execution engine 120 is structured. For instance, graph execution engine 120 analyzes the nodes, input, outputs, etc., specified in first execution graph 120 and generates nodes, inputs, outputs, etc. that are in accordance with the second programming language. The foregoing techniques advantageously require a single interop, whereas conventional techniques require an interop for each API call. Accordingly, by limiting the number of interops, the processing power and/or memory required to execute a machine learning pipeline is advantageously reduced.

Once second execution graph 128 is generated, graph execution engine 120 executes execution graph 128. For instance, graph execution engine 120 may issue a function call corresponding to each of operators 112, as specified by the nodes of execution graph 128. As shown in FIG. 1, each function call may be an API call to API 130, which interfaces graph execution engine 120 with operators 112, thereby enabling graph execution engine 120 to access operators 112. Graph execution engine 120 may specify the input for each call, as specified by execution graph 128, and provide outputs as inputs to calls to other operators of operators 112, as also specified by execution graph 128.

Results of execution graph 128 may be provided to application 126. In accordance with an embodiment, pointers to memory in which the results are located are provided to application 126.

Accordingly, an execution graph representative of a machine learning pipeline may be executed in many ways.

Figure 2:
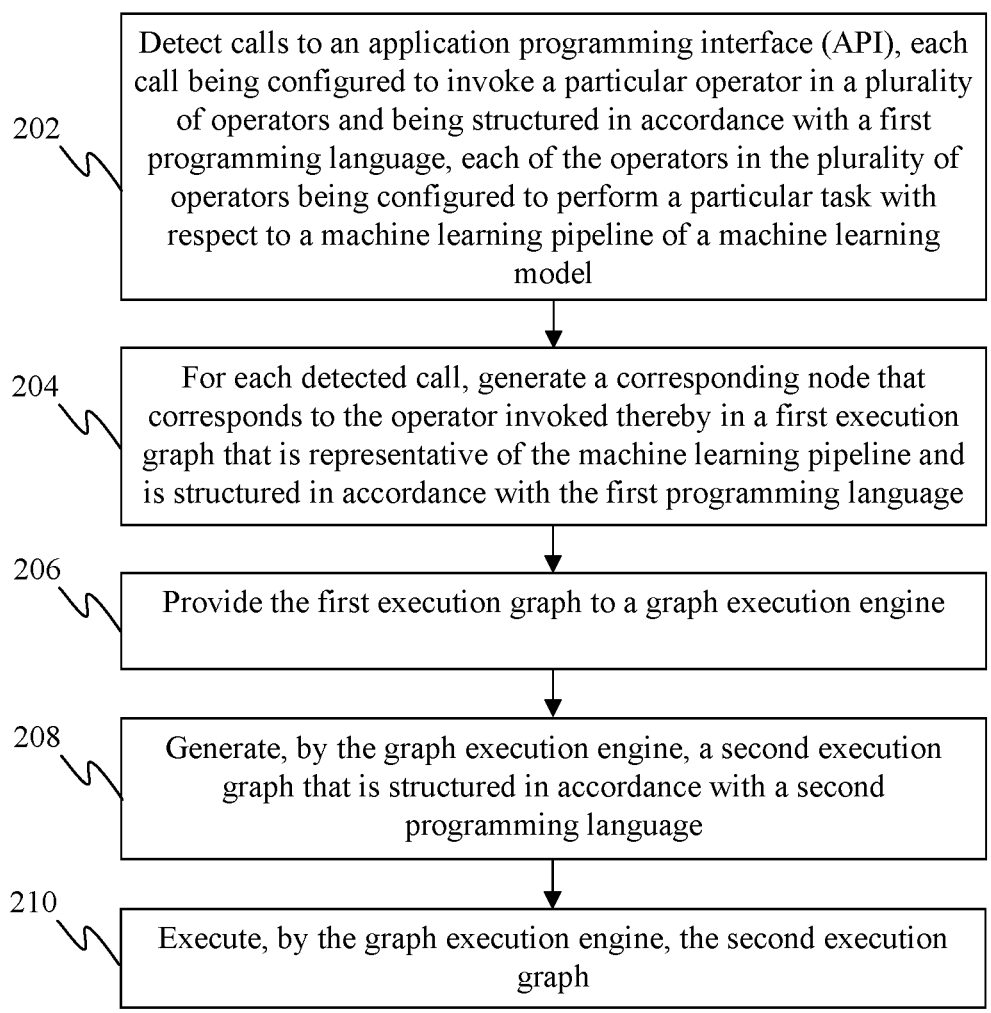
FIG. 2 shows a flowchart of a method for executing an execution graph in accordance with an example embodiment.

For example, FIG. 2 shows a flowchart 200 of a method for executing an execution graph, according to an example embodiment. For purposes of illustration, flowchart 200 is described with continued reference to FIG. 1. Other structural and operational embodiments will be apparent to persons skilled in the relevant art(s) based on the following discussion.

Flowchart 200 of FIG. 2 begins with step 202. In step 202, calls to an API are detected. Each call is configured to invoke a particular operator in a plurality of operators and is structured in accordance with a first programming language. Each of the operators in the plurality of operators are configured to perform a particular task with respect to a machine learning pipeline of a machine learning model. For example, with reference to FIG. 1, API detector 116 detects calls to API 110 from application 126. Each call is configured to invoke an operator of operators 112. Each call may be structured in accordance with a first programming language (e.g., Python, Scala, R, etc.).

In accordance with one or more embodiments, the operators comprise one or more of a data transformation, a data featurizer, or a machine learning algorithm. For example, with reference to FIG. 1, operators 112 may comprise one or more of a data featurizer a data transformer, and/or machine learning algorithm. An example of a data featurizer includes, but is not limited to, featurization techniques that convert text to a numerical vector representation. Examples of a data transformers include, but are not limited to, techniques that normalize and/or scale data, convert data from one data type to another data type, transform text and/or images, etc. Examples of machine learning algorithms include, but are not limited to, a gradient-boosting tree-based machine learning algorithm (e.g., FastTree, LightGBM, etc.), a linear-based machine learning algorithm (e.g., OWL-QN, SDCA, Pegasos, etc.), and/or other types of machine learning algorithms In step 204, for each detected call, a corresponding node that corresponds to the operator invoked thereby is generated in a first execution graph that is representative of the machine learning pipeline and is structured in accordance with the first programming language. For example, with reference to FIG. 1, for each detected call, graph builder 122 generates a node, that corresponds to an operator of operators 112 invoked by the call, in execution graph 118. Execution graph 118 is structured in accordance with the first programming language.

In accordance with one or more embodiments, each node specifies at least one of a name of the corresponding operator, one or more inputs for the corresponding operator, one or more outputs for corresponding operator, another node from which the one or more inputs are provided and, another node to which the one or more outputs are provided.

In step 206, the first execution graph is provided to a graph execution engine. For example, with reference to FIG. 1, graph builder 122 provides first execution graph 118 to graph execution engine 120. Additional details regarding the provision of the first execution graph to the graph execution engine is provided below with reference to FIGS. 3 and 4.

In step 208, a second execution graph that is structured in accordance with a second programming language is generated by the graph execution engine. For example, with reference to FIG. 1, graph execution engine 120 generates execution graph 128 that is structured in accordance with a second programming language (e.g., C #, C++, etc.).

In step 210, the second execution graph is executed by the graph execution engine. For example, with reference to FIG. 1, graph execution engine 120 executes execution graph 128. Additional details regarding the execution of the second execution graph is provided below with reference to FIGS. 5 and 6.

Figure 3:
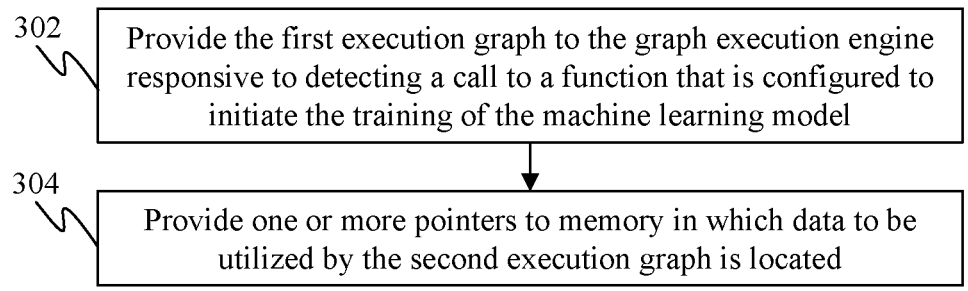
FIG. 3 shows a flowchart of a method for providing an execution graph to an execution engine in accordance with an example embodiment.
Figure 4:
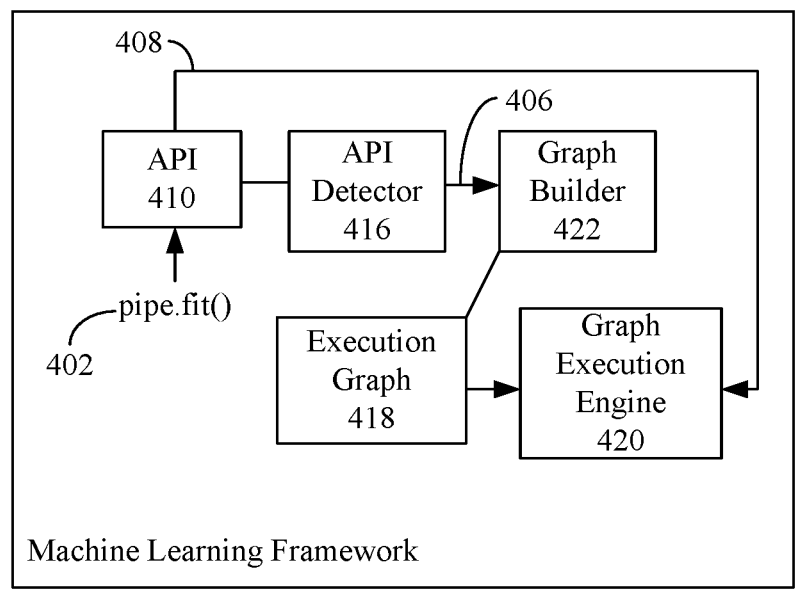
FIG. 4 shows a block diagram of a machine learning framework in accordance with an example embodiment.

FIG. 3 shows a flowchart 300 of a method for providing an execution graph to an execution engine in accordance with an example embodiment. In an embodiment, flowchart 300 may be implemented by a machine learning framework 400 shown in FIG. 4, although the method is not limited to that implementation. FIG. 4 shows a block diagram of machine learning framework 400 in accordance with an example embodiment. Machine learning framework 400 is an example of machine learning framework 104, as described above with reference to FIG. 1. As shown in FIG. 4, machine learning framework 400 includes an API 410, API detector 416, a graph builder 422, and a graph execution engine 420. API 410, API detector 416, graph builder 422, and graph execution engine 420 are examples of API 110, API detector 116, graph builder 122, and graph execution engine 120, as described above with reference to FIG. 1.

Flowchart 300 begins with step 302. In step 302, the first execution graph is provided to the graph execution responsive to receiving a call to detecting a call to a function that is configured to initiate the training of the machine learning model. For example, with reference to FIG. 4, API detector may detect a call 402 to a function (e.g., pipe.fit( ) that is configured to initiate the training of the machine learning model. In response to detecting call 402, API detector 416 may provide an indication 406 to graph builder 422 that causes graph builder 422 to provide an execution graph 418 to graph execution engine 420. Execution graph 418 is an example of execution graph 118, as described above with reference to FIG. 1.

In step 304, one or more pointers to memory in which data to be utilized by the second execution graph is located is provided. For example, with reference to FIG. 4, pointer(s) 408 to memory in which data (e.g., training data) to be utilized by graph execution engine 420 is located is provided to graph execution engine 420.

Figures 5, 6:
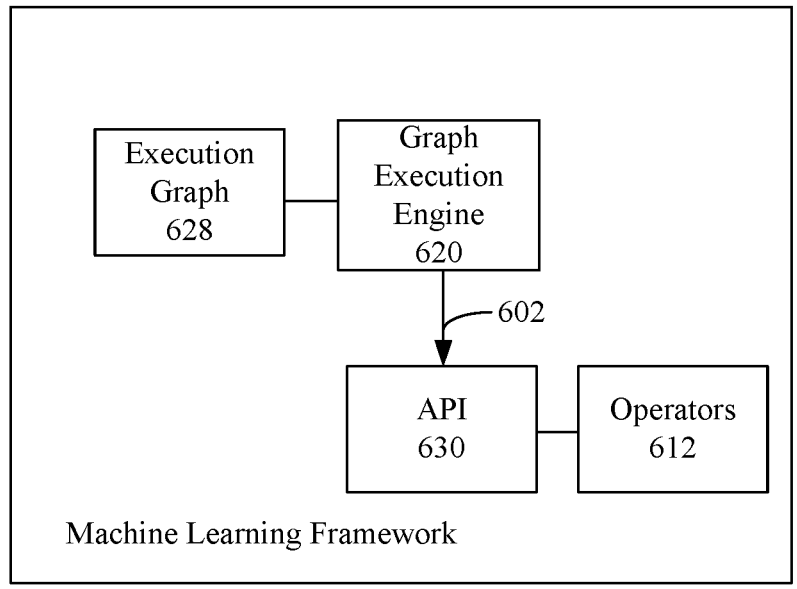
FIG. 5 shows an operation for executing an execution graph in accordance with an example embodiment.
FIG. 6 shows a block diagram of a machine learning framework in accordance with another example embodiment.

FIG. 5 shows an operation 502 for executing an execution graph in accordance with an example embodiment. In an embodiment, operation 502 may be implemented by a machine learning framework 600 shown in FIG. 6, although the method is not limited to that implementation. FIG. 6 shows a block diagram of machine learning framework 600 in accordance with an example embodiment. Machine learning framework 600 is an example of machine learning framework 104, as described above with reference to FIG. 1. As shown in FIG. 6, machine learning framework 600 includes a graph execution engine 620, an API 630, and operators 612. Graph execution engine 620, API 630, and operators 612 are examples of graph execution engine 120, API 130, and operators 112, as described above with reference to FIG. 1.

Flowchart 500 beings with step 502. In step 502, for each node in the second execution graph, a function call corresponding to the operator associated with the node is issued. The function call is structured in accordance with the second programming language. For example, with reference to FIG. 6, graph execution engine 620 analyzes one or more nodes included in an execution graph 628. Each of the node(s) in execution graph 628 may correspond to an operator of operators 612. Execution graph 628 is an example of execution graph 128, as described above with reference to FIG. 1. For each node of execution graph 628, graph execution engine 620 may issue a function call 602, corresponding to an operator of operators 612 associated with the node of execution graph 628, via API 630.

Figure 7:
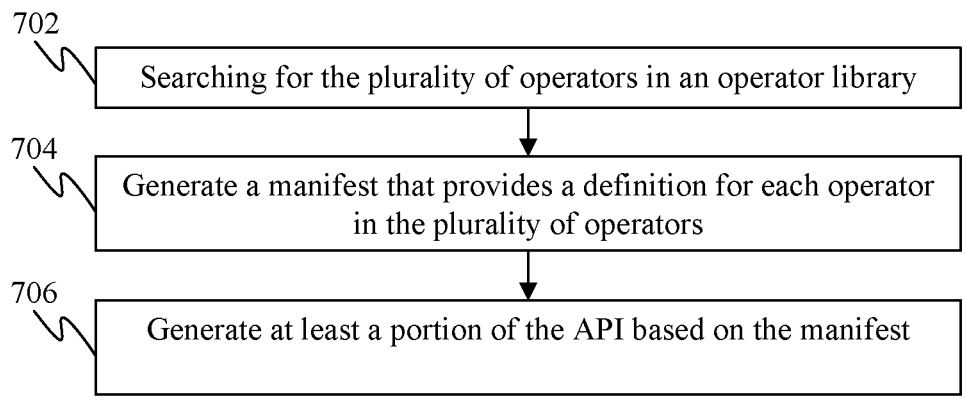
FIG. 7 shows a flowchart of a method for automatically generating an API in accordance with an example embodiment.
Figure 8:
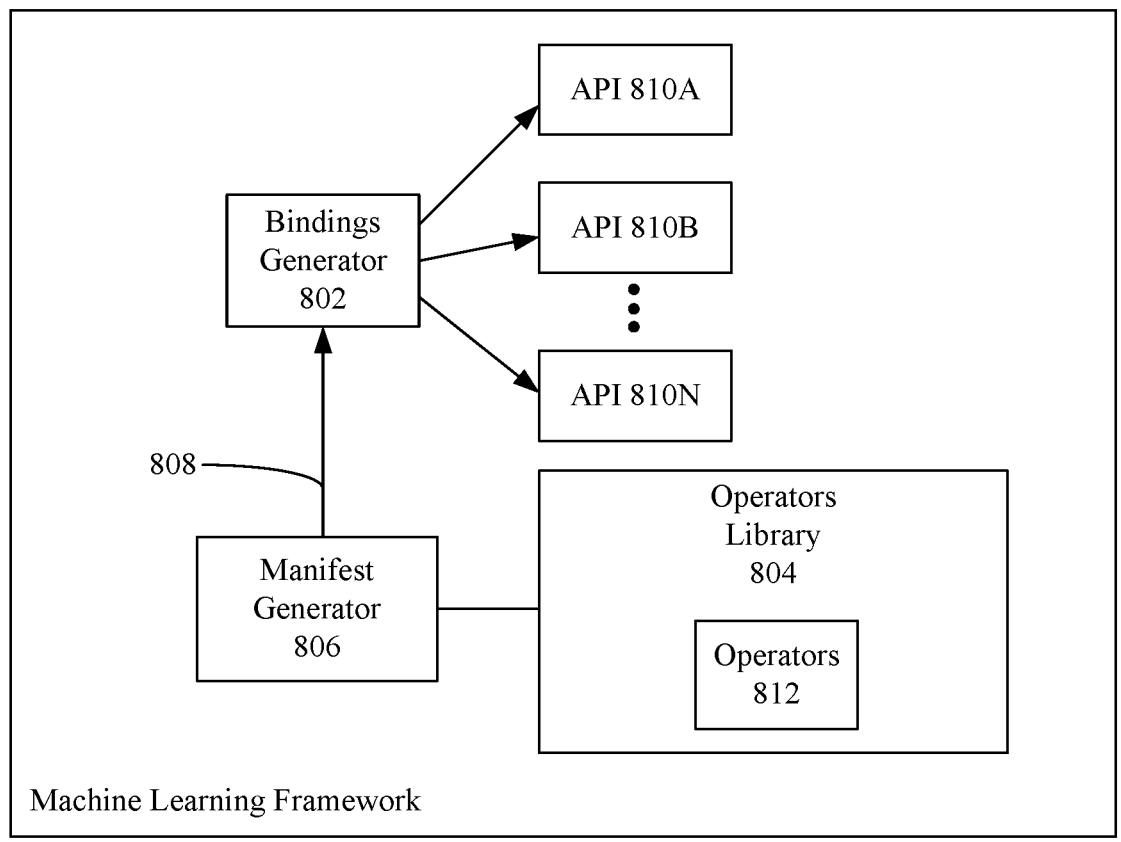
FIG. 8 shows a block diagram of a machine learning framework in accordance with a further example embodiment.

As described above, API 110 may be automatically generated by a bindings generator. Accordingly, FIG. 7 shows a flowchart 700 of a method for automatically generating an API in accordance with an example embodiment. In an embodiment, flowchart 700 may be implemented by a machine learning framework 800 shown in FIG. 8, although the method is not limited to that implementation. FIG. 8 shows a block diagram of machine learning framework 800 in accordance with an example embodiment. Machine learning framework 800 is an example of machine learning framework 104, as described above with reference to FIG. 1. As shown in FIG. 8, machine learning framework 800 includes a bindings generator 802, a manifest generator 806, an operators library 804 comprising operators 812, and one or more APIs 810A-810N. Operators 812 are examples of operators 112, and each of APIs 810A-810B is an example of API 110, as respectively described above with reference to FIG. 1.

Flowchart 700 begins with step 702. In step 702, the plurality of operators is searched for in an operator library. For example, with reference to FIG. 7, manifest generator 806 may be configured to automatically search for operators 812 stored in operators library 804. Manifest generator 806 may automatically search for operators 812 periodically (e.g., hourly, daily, etc.). Alternatively, manifest generator 806 may automatically search for operators 812 responsive to a new operator being added to operators library 804.

In step 704, a manifest that provides a definition for each operator in the plurality of operators is generated. For example, with reference to FIG. 8, manifest generator 806 may automatically generate a manifest 808, which provides a definition for each operator of operators 812. For instance, each of operators 812 may be associated with metadata that provides a definition for each of operators 812. Manifest generator 806 may generate manifest 808 based on the metadata associated with each of operators 812. Manifest generator 806 provides manifest 808 to bindings generator 802

In accordance with one or more embodiments, the definition for each operator specifies at least one of a name of the operator, a description of the operator, one or more inputs for the operator, a data type for each of the one or more inputs, a description for each of the one or more inputs, one or more outputs for the operator, a data type for each of the one or more outputs, or a description for each of the one or more outputs. The metadata may specify the above-described information used to provide the definition.

In step 706, at least a portion of the API is generated based on the manifest. For example, with reference to FIG. 8, bindings generator 802 automatically generates at least a portion of an API based on manifest 808. Bindings generator 802 may generate an API to support any number of programming languages. For example, with reference to FIG. 8, API 810A may be configured to support applications (e.g., application 126) that are structured in Python, thereby enabling Python-based applications to call operators 812 (which are structured in accordance with a different programming language (e.g., C #). API 810B may be configured to support applications that are structured in Scala, thereby enabling Scala-based applications to call operators 812. API 810N may be configured to support applications that are structured in R, thereby enabling R-based applications to call operators 812. It is noted that APIs 810A-810N may be configured to support other programming languages and that the programming languages described above are purely exemplary.

IV. Example Computer System Implementation

Computing device 102, machine learning framework 104, API 110, operators 112, API 130, API detector 116, graph builder 122, execution graph 118, graph execution engine 120, execution graph 128, model builder 106, model builder GUI 114, application 126, machine learning framework 400, API 410, API detector 416, graph builder 422, execution graph 418, graph execution engine 420, machine learning framework 600, execution graph 628, graph execution engine 620, API 630, operators 612, machine learning framework 800, bindings generators 802, manifest generator 806, operators library 804, operators 812, and/or APIs 810A-810N (and/or any of the components described therein), and/or flowchart 200, 300, 500, and 700 may be implemented in hardware, or hardware combined with one or both of software and/or firmware. For example, computing device 102, machine learning framework 104, API 110, operators 112, API 130, API detector 116, graph builder 122, execution graph 118, graph execution engine 120, execution graph 128, model builder 106, model builder GUI 114, application 126, machine learning framework 400, API 410, API detector 416, graph builder 422, execution graph 418, graph execution engine 420, machine learning framework 600, execution graph 628, graph execution engine 620, API 630, operators 612, machine learning framework 800, bindings generators 802, manifest generator 806, operators library 804, operators 812, and/or APIs 810A-810N (and/or any of the components described therein), and/or flowchart 200, 300, 500, and 700 may be implemented as computer program code/instructions configured to be executed in one or more processors and stored in a computer readable storage medium.

Alternatively, computing device 102, machine learning framework 104, API 110, operators 112, API 130, API detector 116, graph builder 122, execution graph 118, graph execution engine 120, execution graph 128, model builder 106, model builder GUI 114, application 126, machine learning framework 400, API 410, API detector 416, graph builder 422, execution graph 418, graph execution engine 420, machine learning framework 600, execution graph 628, graph execution engine 620, API 630, operators 612, machine learning framework 800, bindings generators 802, manifest generator 806, operators library 804, operators 812, and/or APIs 810A-810N (and/or any of the components described therein), and/or flowchart 200, 300, 500, and 700 may be implemented as hardware logic/electrical circuitry.

For instance, in an embodiment, one or more, in any combination, of computing device 102, machine learning framework 104, API 110, operators 112, API 130, API detector 116, graph builder 122, execution graph 118, graph execution engine 120, execution graph 128, model builder 106, model builder GUI 114, application 126, machine learning framework 400, API 410, API detector 416, graph builder 422, execution graph 418, graph execution engine 420, machine learning framework 600, execution graph 628, graph execution engine 620, API 630, operators 612, machine learning framework 800, bindings generators 802, manifest generator 806, operators library 804, operators 812, and/or APIs 810A-810N (and/or any of the components described therein), and/or flowchart 200, 300, 500, and 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
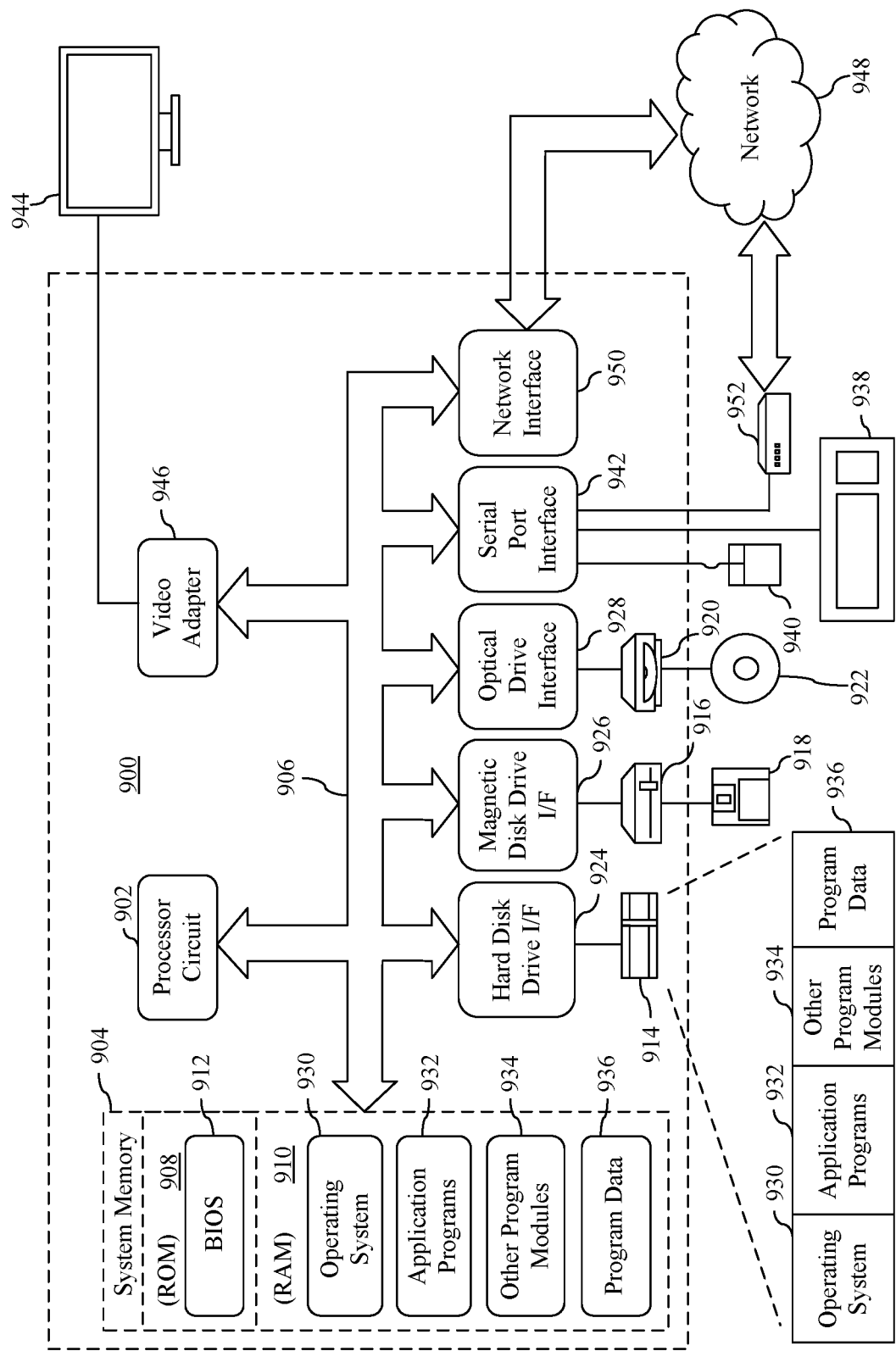
FIG. 9 is a block diagram of an example processor-based computer system that may be used to implement various embodiments.

FIG. 9 depicts an exemplary implementation of a computing device 900 in which embodiments may be implemented. For example, computing devices 102 machine learning framework 104, machine learning framework 400, machine learning framework 600, and/or machine learning framework 800 may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing any of the features of computing device 102, machine learning framework 104, API 110, operators 112, API 130, API detector 116, graph builder 122, execution graph 118, graph execution engine 120, execution graph 128, model builder 106, model builder GUI 114, application 126, machine learning framework 400, API 410, API detector 416, graph builder 422, execution graph 418, graph execution engine 420, machine learning framework 600, execution graph 628, graph execution engine 620, API 630, operators 612, machine learning framework 800, bindings generators 802, manifest generator 806, operators library 804, operators 812, and/or APIs 810A-810N (and/or any of the components described therein), and/or flowchart 200, 300, 500, and 700, and/or further embodiments described herein.

A user may enter commands and information into computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Example Embodiments

A method is described herein. The method comprises: detecting calls to an application programming interface (API), each call being configured to invoke a particular operator in a plurality of operators and being structured in accordance with a first programming language, each of the operators in the plurality of operators being configured to perform a particular task with respect to a machine learning pipeline of a machine learning model; for each detected call, generating a corresponding node that corresponds to the operator invoked thereby in a first execution graph that is representative of the machine learning pipeline and is structured in accordance with the first programming language; providing the first execution graph to a graph execution engine; generating, by the graph execution engine, a second execution graph that is structured in accordance with a second programming language; and executing, by the graph execution engine, the second execution graph.

In one embodiment of the foregoing method, the method further comprises: searching for the plurality of operators in an operator library; generating a manifest that provides a definition for each operator in the plurality of operators; and generating at least a portion of the API based on the manifest.

In one embodiment of the foregoing method, the definition for each operator specifies at least one of: a name of the operator; a description of the operator; one or more inputs for the operator; a data type for each of the one or more inputs; a description for each of the one or more inputs; one or more outputs for the operator; a data type for each of the one or more outputs; or a description for each of the one or more outputs.

In one embodiment of the foregoing method, the plurality of operators comprises one or more of: a data transformation; a data featurizer; or a machine learning algorithm.

In one embodiment of the foregoing method, providing the first execution graph to the graph execution engine comprises: providing the first execution graph to the graph execution engine responsive to receiving a call to a function that is configured to initiate the training of the machine learning model; and wherein providing the first execution graph to the graph execution engine further comprises: providing one or more pointers to memory in which data to be utilized by the second execution graph is located.

In one embodiment of the foregoing method, each node specifies at least one of: a name of the corresponding operator; one or more inputs for the corresponding operator; one or more outputs for corresponding operator; another node from which the one or more inputs are provided; or another node to which the one or more outputs are provided.

In one embodiment of the foregoing method, the second execution graph comprises a plurality of nodes each of which corresponds to an operator and executing, by the graph execution engine, the second execution graph comprises: for each node in the second execution graph, issuing a function call corresponding to the operator associated with the node, the function call being structured in accordance with the second programming language.

A system is also described herein. The system includes at least one processor circuit; and at least one memory that stores program code configured to be executed by the at least one processor circuit, the program code comprising: an API detector configured to detect calls to an application programming interface (API), each call being configured to invoke a particular operator in a plurality of operators and being structured in accordance with a first programming language, each of the operators in the plurality of operators being configured to perform a particular task with respect to a machine learning pipeline of a machine learning model; a graph builder configured to, for each detected call, generate a corresponding node that corresponds to the operator invoked thereby in a first execution graph that is representative of the machine learning pipeline and is structured in accordance with the first programming language; and a graph execution engine configured to: receive the first execution graph to a graph execution engine; generate a second execution graph that is structured in accordance with a second programming language; and execute the second execution graph.

In one embodiment of the foregoing system, the program code further comprises: a manifest generator configured to: search for the plurality of operators in an operator library; and generate a manifest that provides a definition for each operator in the plurality of operators; and a bindings generator configured to generate at least a portion of the API based on the manifest.

In one embodiment of the foregoing system, the definition for each operator specifies at least one of: a name of the operator; a description of the operator; one or more inputs for the operator; a data type for each of the one or more inputs; a description for each of the one or more inputs; one or more outputs for the operator; a data type for each of the one or more outputs; or a description for each of the one or more outputs.

In one embodiment of the foregoing system, the plurality of operators comprises one or more of: a data transformation; a data featurizer; or a machine learning algorithm.

In one embodiment of the foregoing system, each node specifies at least one of: a name of the corresponding operator; one or more inputs for the corresponding operator; one or more outputs for corresponding operator; another node from which the one or more inputs are provided; or another node to which the one or more outputs are provided.

In one embodiment of the foregoing system, the second execution graph comprises a plurality of nodes each of which corresponds to an operator and the graph execution engine is further configured to: for each node in the second execution graph, issue a function call corresponding to the operator associated with the node, the function call being structured in accordance with the second programming language.

A computer-readable storage medium having program instructions recorded thereon that, when executed by at least one processor of a computing device, perform a method. The method includes: detecting calls to an application programming interface (API), each call being configured to invoke a particular operator in a plurality of operators and being structured in accordance with a first programming language, each of the operators in the plurality of operators being configured to perform a particular task with respect to a machine learning pipeline of a machine learning model; for each detected call, generating a corresponding node that corresponds to the operator invoked thereby in a first execution graph that is representative of the machine learning pipeline and is structured in accordance with the first programming language; providing the first execution graph to a graph execution engine; generating, by the graph execution engine, a second execution graph that is structured in accordance with a second programming language; and executing, by the graph execution engine, the second execution graph.

In one embodiment of the foregoing computer-readable storage medium, the method further comprises: searching for the plurality of operators in an operator library; generating a manifest that provides a definition for each operator in the plurality of operators; and generating at least a portion of the API based on the manifest.

In one embodiment of the foregoing computer-readable storage medium, the definition for each operator specifies at least one of: a name of the operator; a description of the operator; one or more inputs for the operator; a data type for each of the one or more inputs; a description for each of the one or more inputs; one or more outputs for the operator; a data type for each of the one or more outputs; or a description for each of the one or more outputs.

In one embodiment of the foregoing computer-readable storage medium, the plurality of operators comprises one or more of: a data transformation; a data featurizer; or a machine learning algorithm.

In one embodiment of the foregoing computer-readable storage medium, providing the first execution graph to the graph execution engine comprises: providing the first execution graph to the graph execution engine responsive to receiving a call to a function that is configured to initiate the training of the machine learning model; and providing the first execution graph to the graph execution engine further comprises: providing one or more pointers to memory in which data to be utilized by the second execution graph is located.

In one embodiment of the foregoing computer-readable storage medium, each node specifies at least one of: a name of the corresponding operator; one or more inputs for the corresponding operator; one or more outputs for corresponding operator; another node from which the one or more inputs are provided; or another node to which the one or more outputs are provided.

In one embodiment of the foregoing computer-readable storage medium, the second execution graph comprises a plurality of nodes each of which corresponds to an operator and executing, by the graph execution engine, the second execution graph comprises: for each node in the second execution graph, issuing a function call corresponding to the operator associated with the node, the function call being structured in accordance with the second programming language.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    detecting calls to an application programming interface (API), each call being configured to invoke a particular operator in a plurality of operators and being structured in accordance with a first programming language, each of the operators in the plurality of operators being configured to perform a particular task with respect to a machine learning pipeline of a machine learning model;
    for each detected call, generating a corresponding node that corresponds to the operator invoked thereby in a first execution graph that is representative of the machine learning pipeline and is structured in accordance with the first programming language;
    providing the first execution graph to a graph execution engine;
    generating, by the graph execution engine, a second execution graph that is structured in accordance with a second programming language; and
    executing, by the graph execution engine, the second execution graph.

2. The method of claim 1, further comprising:
    searching for the plurality of operators in an operator library;
    generating a manifest that provides a definition for each operator in the plurality of operators; and
    generating at least a portion of the API based on the manifest.

3. The method of claim 2, wherein the definition for each operator specifies at least one of:
    a name of the operator;
    a description of the operator;
    one or more inputs for the operator;
    a data type for each of the one or more inputs;
    a description for each of the one or more inputs;
    one or more outputs for the operator;
    a data type for each of the one or more outputs; or
    a description for each of the one or more outputs.

4. The method of claim 1, wherein the plurality of operators comprises one or more of:
    a data transformation;
    a data featurizer; or
    a machine learning algorithm.

5. The method of claim 1, wherein providing the first execution graph to the graph execution engine comprises:
    providing the first execution graph to the graph execution engine responsive to receiving a call to a function that is configured to initiate the training of the machine learning model; and
    wherein providing the first execution graph to the graph execution engine further comprises:
    providing one or more pointers to memory in which data to be utilized by the second execution graph is located.

6. The method of claim 1, wherein each node specifies at least one of:
    a name of the corresponding operator;
    one or more inputs for the corresponding operator;
    one or more outputs for corresponding operator;
    another node from which the one or more inputs are provided; or
    another node to which the one or more outputs are provided.

7. The method of claim 1, wherein the second execution graph comprises a plurality of nodes each of which corresponds to an operator and wherein said executing, by the graph execution engine, the second execution graph comprises:

for each node in the second execution graph, issuing a function call corresponding to the operator associated with the node, the function call being structured in accordance with the second programming language.

8. A system, comprising:
at least one processor circuit; and
at least one memory that stores program code configured to be executed by the at least one processor circuit, the program code comprising:
an API detector configured to detect calls to an application programming interface (API), each call being configured to invoke a particular operator in a plurality of operators and being structured in accordance with a first programming language, each of the operators in the plurality of operators being configured to perform a particular task with respect to a machine learning pipeline of a machine learning model;
a graph builder configured to, for each detected call, generate a corresponding node that corresponds to the operator invoked thereby in a first execution graph that is representative of the machine learning pipeline and is structured in accordance with the first programming language; and
a graph execution engine configured to:
receive the first execution graph to a graph execution engine;
generate a second execution graph that is structured in accordance with a second programming language; and
execute the second execution graph.

9. The system of claim 8, wherein the program code further comprises:
a manifest generator configured to:
search for the plurality of operators in an operator library; and
generate a manifest that provides a definition for each operator in the plurality of operators; and
a bindings generator configured to generate at least a portion of the API based on the manifest.

10. The system of claim 9, wherein the definition for each operator specifies at least one of:
a name of the operator;
a description of the operator;
one or more inputs for the operator;
a data type for each of the one or more inputs;
a description for each of the one or more inputs;
one or more outputs for the operator;
a data type for each of the one or more outputs; or
a description for each of the one or more outputs.

11. The system of claim 8, wherein the plurality of operators comprises one or more of:
a data transformation;
a data featurizer; or
a machine learning algorithm.

12. The system of claim 8, wherein each node specifies at least one of:
a name of the corresponding operator;
one or more inputs for the corresponding operator;
one or more outputs for corresponding operator;
another node from which the one or more inputs are provided; or
another node to which the one or more outputs are provided.

13. The system of claim 8, wherein the second execution graph comprises a plurality of nodes each of which corresponds to an operator and wherein the graph execution engine is further configured to:

for each node in the second execution graph, issue a function call corresponding to the operator associated with the node, the function call being structured in accordance with the second programming language.

14. A computer-readable storage medium having program instructions recorded thereon that, when executed by at least one processor of a computing device, perform a method, the method comprising:
detecting calls to an application programming interface (API), each call being configured to invoke a particular operator in a plurality of operators and being structured in accordance with a first programming language, each of the operators in the plurality of operators being configured to perform a particular task with respect to a machine learning pipeline of a machine learning model;
for each detected call, generating a corresponding node that corresponds to the operator invoked thereby in a first execution graph that is representative of the machine learning pipeline and is structured in accordance with the first programming language;
providing the first execution graph to a graph execution engine;
generating, by the graph execution engine, a second execution graph that is structured in accordance with a second programming language; and
executing, by the graph execution engine, the second execution graph.

15. The computer-readable storage medium of claim 14, wherein the method further comprises:
searching for the plurality of operators in an operator library;
generating a manifest that provides a definition for each operator in the plurality of operators; and
generating at least a portion of the API based on the manifest.

16. The computer-readable storage medium of claim 15, wherein the definition for each operator specifies at least one of:
a name of the operator;
a description of the operator;
one or more inputs for the operator;
a data type for each of the one or more inputs;
a description for each of the one or more inputs;
one or more outputs for the operator;
a data type for each of the one or more outputs; or
a description for each of the one or more outputs.

17. The computer-readable storage medium of claim 14, wherein the plurality of operators comprises one or more of:
a data transformation;
a data featurizer; or
a machine learning algorithm.

18. The computer-readable storage medium of claim 14, wherein providing the first execution graph to the graph execution engine comprises:
providing the first execution graph to the graph execution engine responsive to receiving a call to a function that is configured to initiate the training of the machine learning model; and
wherein providing the first execution graph to the graph execution engine further comprises:
providing one or more pointers to memory in which data to be utilized by the second execution graph is located.

19. The computer-readable storage medium of claim 14, wherein each node specifies at least one of:
a name of the corresponding operator;
one or more inputs for the corresponding operator;

one or more outputs for corresponding operator;

another node from which the one or more inputs are provided; or another node to which the one or more outputs are provided.

20. The computer-readable storage medium of claim 14, wherein the second execution graph comprises a plurality of nodes each of which corresponds to an operator and wherein said executing, by the graph execution engine, the second execution graph comprises:

for each node in the second execution graph, issuing a function call corresponding to the operator associated with the node, the function call being structured in accordance with the second programming language.

* * * * *